(12) United States Patent
Netto et al.

(10) Patent No.: US 10,659,959 B2
(45) Date of Patent: May 19, 2020

(54) ENHANCED CELL BROADCAST SERVICE VIA SECURE GROUP BROADCAST

(71) Applicant: BlackBerry Limited, Waterloo (CA)

(72) Inventors: John David Netto, Nepean (CA); Shu-Lin Chen, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/539,278

(22) Filed: Nov. 12, 2014

(65) Prior Publication Data
US 2016/0135042 A1    May 12, 2016

(51) Int. Cl.
| | | |
|---|---|---|
| *H04W 12/04* | (2009.01) | |
| *H04L 9/08* | (2006.01) | |
| *H04L 29/06* | (2006.01) | |
| *H04W 72/00* | (2009.01) | |
| *H04W 28/26* | (2009.01) | |
| *H04W 4/08* | (2009.01) | |
| *H04W 12/00* | (2009.01) | |

(52) U.S. Cl.
CPC .......... *H04W 12/04* (2013.01); *H04L 9/0822* (2013.01); *H04L 9/0833* (2013.01); *H04L 63/0428* (2013.01); *H04L 63/0435* (2013.01); *H04L 63/062* (2013.01); *H04L 63/065* (2013.01); *H04W 4/08* (2013.01); *H04W 12/0013* (2019.01); *H04W 12/04033* (2019.01); *H04W 28/26* (2013.01); *H04W 72/005* (2013.01); *H04L 2209/601* (2013.01); *H04L 2209/80* (2013.01); *H04W 12/0052* (2019.01)

(58) Field of Classification Search
CPC ..... H04L 63/065; H04L 63/062; H04L 63/06; H04L 9/0819; H04L 9/083; H04L 9/0833; H04W 12/04
See application file for complete search history.

(56) References Cited

U.S. PATENT DOCUMENTS

| | | | | |
|---|---|---|---|---|
| 6,282,294 | B1 * | 8/2001 | Deo | G06F 1/3209 |
| | | | | 380/270 |
| 6,496,928 | B1 * | 12/2002 | Deo | G06F 1/3209 |
| | | | | 380/270 |
| 6,510,515 | B1 | 1/2003 | Raith | |
| 6,556,835 | B1 * | 4/2003 | Raivisto | H04L 63/0428 |
| | | | | 455/466 |

(Continued)

FOREIGN PATENT DOCUMENTS

WO        02/01799        7/2002

OTHER PUBLICATIONS

Extended European Search Report, European Application No. 15194365, dated Jan. 25, 2016.

(Continued)

*Primary Examiner* — Zachary A. Davis
(74) *Attorney, Agent, or Firm* — Moffat & Co (57) ABSTRACT

A secure cell broadcast method entails defining a group of mobile devices, reserving a channel for the group, associating cryptographic key material with the group, notifying the mobile devices of the channel for the group, securely providing the key material to the mobile devices of the group, and broadcasting on the channel a secure broadcast message that is encrypted such that the mobile devices of the group receiving on the channel can receive and decrypt the secure broadcast message using the key material.

12 Claims, 8 Drawing Sheets

(56) References Cited

U.S. PATENT DOCUMENTS

| | | | | |
|---|---|---|---|---|
| 6,732,101 | B1* | 5/2004 | Cook | G06Q 10/107 |
| 6,760,752 | B1* | 7/2004 | Liu | H04L 63/0428 |
| 6,832,314 | B1* | 12/2004 | Irvin | H04L 1/0061 |
| | | | | 370/360 |
| 7,444,133 | B1* | 10/2008 | McNamara | H04L 63/065 |
| | | | | 455/411 |
| 7,657,741 | B2* | 2/2010 | Adams | H04L 29/06 |
| | | | | 713/166 |
| 7,698,388 | B2* | 4/2010 | Hoover | G06F 21/6218 |
| | | | | 709/219 |
| 7,903,593 | B2* | 3/2011 | Fuchs | H04L 12/1836 |
| | | | | 370/310 |
| 8,042,189 | B2* | 10/2011 | Little | G06F 12/0261 |
| | | | | 707/781 |
| 8,549,287 | B2* | 10/2013 | Sarkkinen | H04L 12/1859 |
| | | | | 713/150 |
| 8,666,305 | B2* | 3/2014 | Al Qalqili | G06Q 30/02 |
| | | | | 455/3.01 |
| 8,914,849 | B2* | 12/2014 | Ramprasad | H04L 63/065 |
| | | | | 380/270 |
| 9,271,130 | B2* | 2/2016 | Ireland | H04W 4/14 |
| 9,973,899 | B1* | 5/2018 | Andrews | H04W 4/06 |
| 10,039,001 | B2* | 7/2018 | Koyun | H04L 63/0428 |
| 10,136,266 | B2* | 11/2018 | Ahmad | H04L 65/4061 |
| 2007/0073823 | A1* | 3/2007 | Cohen | G06Q 10/107 |
| | | | | 709/207 |
| 2008/0049941 | A1* | 2/2008 | Kim | H04W 12/04 |
| | | | | 380/278 |
| 2009/0265552 | A1* | 10/2009 | Moshir | H04L 63/0464 |
| | | | | 713/168 |
| 2012/0314864 | A1 | 12/2012 | Ramprasad et al. | |
| 2013/0157609 | A1* | 6/2013 | Vainik | G06F 11/0781 |
| | | | | 455/404.1 |

OTHER PUBLICATIONS

European Patent Office, Office Action for Application No. 15194365.1, dated May 3, 2017.

European Patent Office, Communication from the Examining Division for Application No. 15194365.1, dated Jan. 3, 2018.

European Patent Office, extended European search report for application 15194365.1, dated Jul. 23, 2019.

* cited by examiner

ENHANCED CELL BROADCAST SERVICE VIA SECURE GROUP BROADCAST

TECHNICAL FIELD

The present disclosure relates generally to wireless communications and, in particular, to cell broadcast service technologies.

BACKGROUND

Cell Broadcast Service (CBS), also known as Short Message Service-Cell Broadcast (SMS-CB), is a point-to-area (one-to-many) mobile technology defined in the Global System for Mobile Communications (GSM) standard and also supported by Universal Mobile Telecommunication System (UMTS) and Long-Term Evolution (LTE). An equivalent cell broadcast technology exists for Code Division Multiple Access (CDMA), i.e. the CDMA broadcast SMS message service. CBS permits broadcast of a message to multiple mobile devices connected to one or more cells in a specified geographical area. CBS messages may be broadcast to all receivers in a particular region. CBS may be used for broadcasting alerts, emergency information, weather reports, location-based news, or the like.

SUMMARY OF THE INVENTION

According to one embodiment, the disclosure provides a secure cell broadcast method. The method entails defining a group of mobile devices, reserving a channel for the group, associating cryptographic key material with the group, notifying the mobile devices of the channel for the group, securely providing the key material to the mobile devices of the group, and broadcasting on the channel a secure broadcast message that is encrypted such that the mobile devices of the group receiving on the channel can receive and decrypt the secure broadcast message using the key material.

BRIEF DESCRIPTION OF THE DRAWINGS

Further features and advantages of the present disclosure will become apparent from the following detailed description, taken in combination with the appended drawings, in which.

It will be noted that throughout the appended drawings like features are identified by like reference numerals.

DETAILED DESCRIPTION

CBS messages are unencrypted so as to be readable by all recipients. However, in some cases, secured CBS messaging would be useful. Accordingly, an improved cell broadcast service is needed.

The present disclosure provides a technique for securely broadcasting Enhanced Cell Broadcast Service (ECBS) messages by defining a group of mobile devices and distributing key material to the mobile devices of the ECBS group to enable these mobile devices to decrypt encrypted ECBS messages.

Accordingly, one aspect of the present disclosure is a secure broadcast method, performed by a computing device. The secure cell broadcast method entails defining a group of mobile devices, reserving a channel for the group, associating cryptographic key material with the group, notifying the mobile devices of the channel for the group, securely providing the key to the mobile devices of the group, and broadcasting on the channel a secure broadcast message that is encrypted such that the mobile devices of the group within targeted cells receiving on the channel can receive and decrypt the secure broadcast message using the key material.

Another aspect of the present disclosure is a non-transitory computer-readable medium comprising instructions in code which when loaded into a memory and executed by a processor of one or more computing devices cause the one or more computing devices to define a group of mobile devices, reserve a channel for the group, associate cryptographic key material with the group, notify the mobile devices of the channel for the group, securely provide the key to the mobile devices of the group, and broadcast on the channel a secure broadcast message that is encrypted such that the mobile devices of the group within targeted cells receiving on the channel can receive and decrypt the secure broadcast message using the key material.

Another aspect of the present disclosure is a secure cell broadcast system comprising one or more computing devices each having a memory coupled to a processor, wherein the one or more computing devices are configured to reserve a channel for the group, associate cryptographic key material with the group, notify the mobile devices of the channel for the group, securely provide the key to the mobile devices of the group, and broadcast on the channel a secure broadcast message that is encrypted such that the mobile devices of the group receiving on the channel can receive and decrypt the secure broadcast message using the key material. The definition of the group may also include a list of default targeted cells, an expiry date, and other service and billing parameters.

The details and particulars of these aspects of the technology will now be described below, by way of example, with reference to the drawings.

Figure 1:
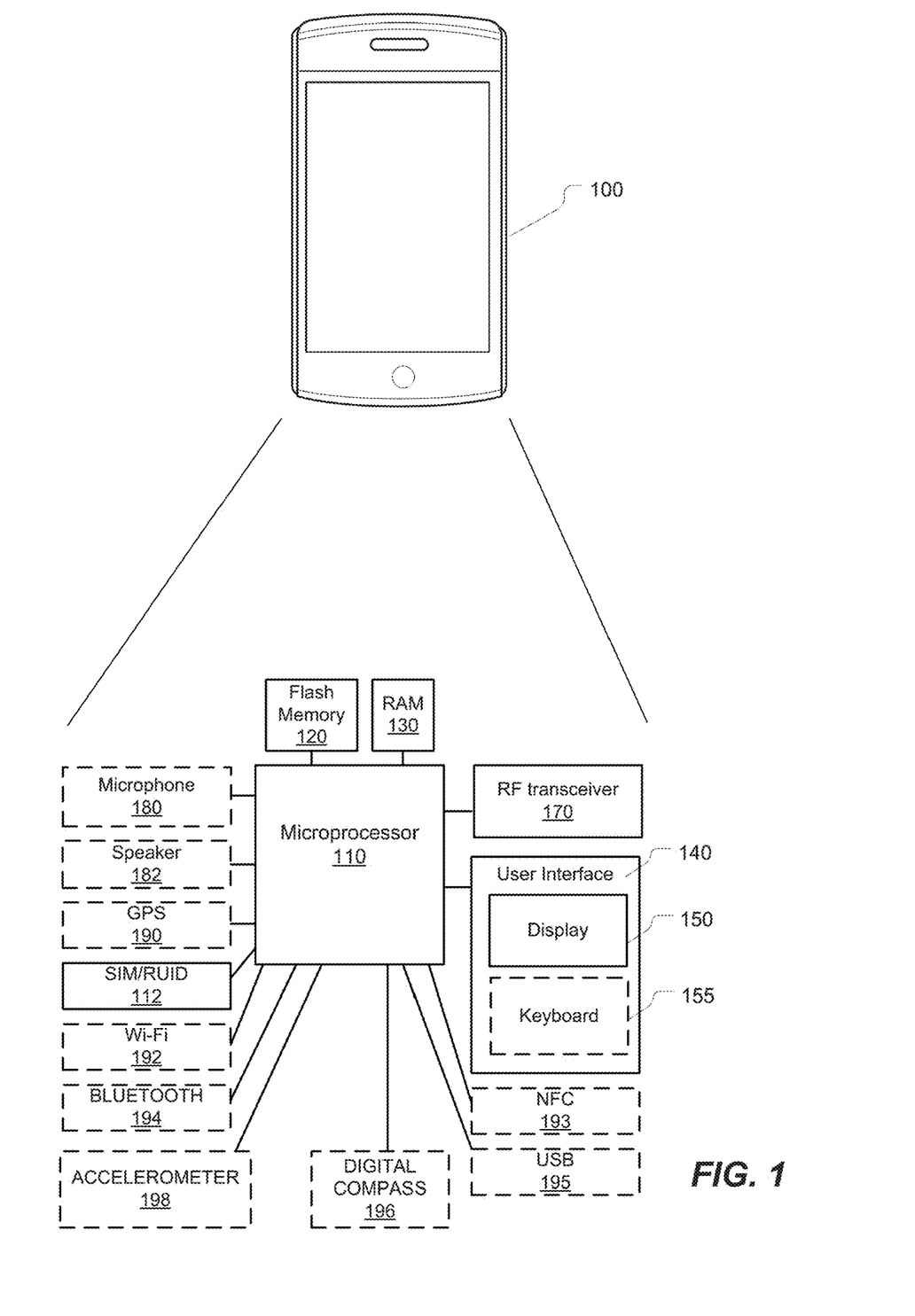
FIG. 1 is a depiction of a mobile device implementing the new technology.

FIG. 1 is a depiction of a mobile device that may be used to receive, decrypt and display secure enhanced cell broadcast service (ECBS) messages. The mobile device may also be used by a group administrator as a group administrator device to create and manage one or more groups to receive the ECBS messages, as will be elaborated below. The mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devise, such as a display screen 150 (e.g. an LCD or LED screen or touch-sensitive display screen), and may optionally include a keyboard 155 or keypad. The user interface may also include an optical jog pad and/or a thumbwheel, trackball, track pad or equivalent.

As depicted by way of example in FIG. 1, the mobile device 100 includes a cellular radiofrequency (RF) transceiver 170. The cellular radiofrequency transceiver 170 enables wireless communication with one or more base stations over a cellular wireless network using cellular communication protocols and standards for both voice calls and packet data transfer such as GSM, CDMA, General Packet Radio Service (GPRS), Enhanced Data rates for GSM Evolution (EDGE), UMTS, LTE, etc.

The mobile device 100 may include a Subscriber Identity Module (SIM) card 112 for GSM-type devices or a Re-Usable Identification Module (RUIM) card for CDMA-type devices. The cellular RF transceiver 170 may include separate voice and data channels.

The mobile device 100 may also include one or more ports for wired connections, e.g. USB 195, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 may include a position-determining subsystem such as a Global Navigation Satellite System (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 100 optionally includes a Wi-Fi transceiver 192 for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification.

The mobile device 100 optionally includes a Bluetooth® transceiver 194, and/or a near-field communications (NFC) chip 193. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver. The NFC chip 193 (e.g. NFC Secure Element) may be used to securely exchange keys between the group administrator device and the various mobile devices of the members of the group. Secure provisioning may alternatively be done using any other secure wireless or wired communication link. For example, the USB connection 195 may be used for a wired communication link.

Optionally, the mobile device may include other sensors such as a digital compass 196 and/or accelerometer 198. Other sensors may include a tilt sensor, gyro or equivalent.

The mobile device 100 may comprise a wireless communications device, tablet, personal digital assistant, cell phone, smart phone, smart watch, smart accessory, gaming device or any other electronic device that has a cellular transceiver for receiving a CBS message.

Figure 2:
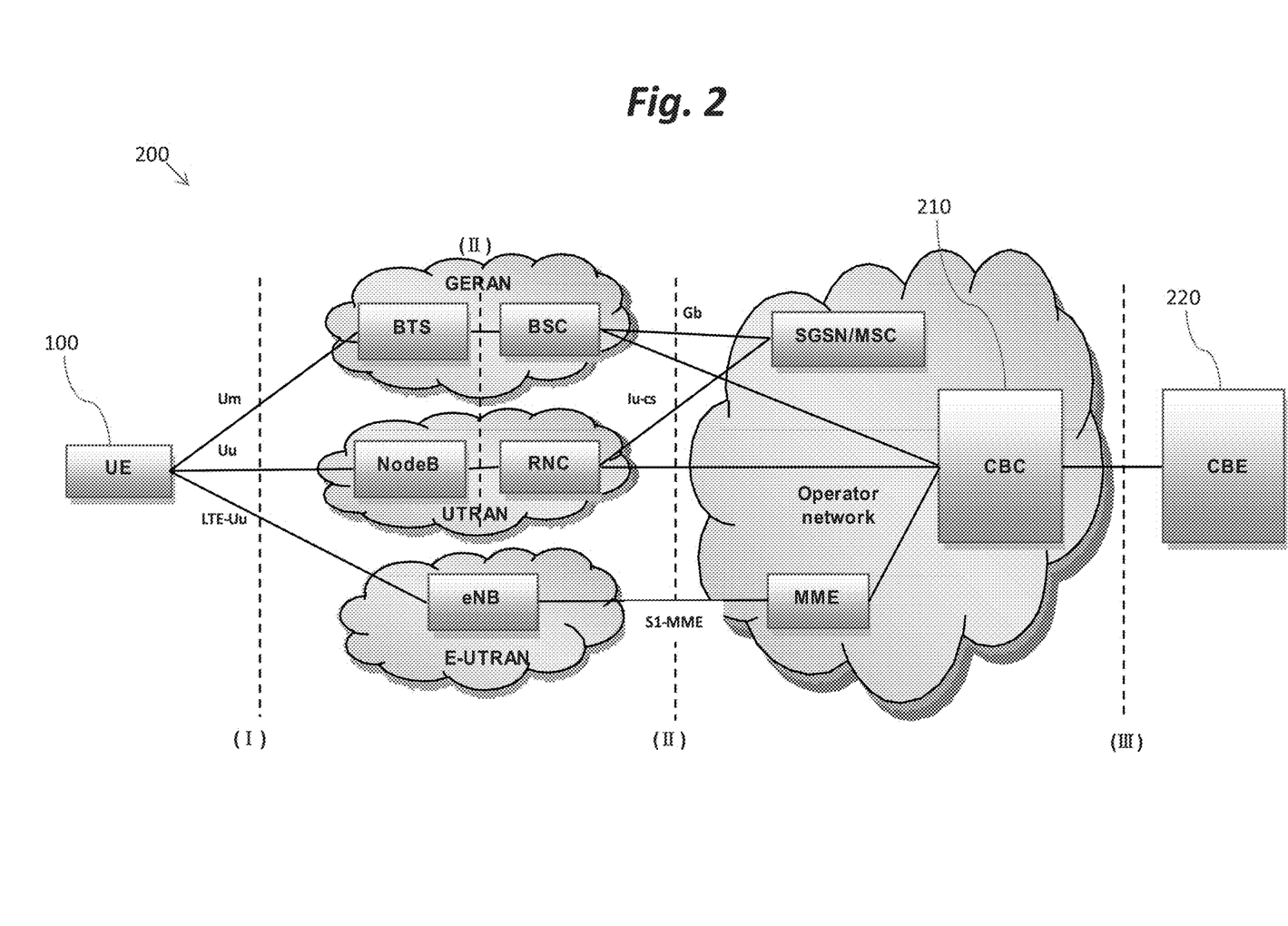
FIG. 2 is a depiction of a cell broadcast system.

In the embodiment depicted by way of example in FIG. 2, a CBS communication system 200 includes the mobile device 100, i.e. user equipment (UE). The mobile device connects to a cellular network using global system for mobile communications (GSM), universal mobile telecommunications system (UMTS), Long Term Evolution (LTE), or 3GPP2 (CDMA), or other cellular network standard depending on the mobile device's capabilities and network carrier. As shown in FIG. 2, a GSM EDGE Radio Access Network (GERAN) includes a base transceiver station (BTS), base station controller (BSC), Serving GPRS Support Node (SGSN) and mobile switching center (MSC). As further shown in FIG. 2, a Universal Terrestrial Radio Access Network (UTRAN) includes a Node B (base station) and Radio Network Controller (RNC). As further shown in FIG. 2, an Evolved UMTS Terrestrial Radio Access Network (E-UTRAN) providing LTE service includes a Node B (base station) or eNode B (eNB) and MME (Mobility Management Entity) which acts as a control node. The system also includes a Cell Broadcast Center (CBC) 210. This CBC is connected to the base station controller (BSC) in the GSM network or to a radio network controller (RNC) in the UMTS network or to the MME in the LTE network. The BSC-CBC interface is described in 3GPP standard TS 48.049. The RNC-CBC interface is described in 3GPP standard TS 25.419. The CBC 210 sends SMS-CB messages, a list of cells defining a broadcast area, and a requested repetition rate. The BSC and RNC deliver the SMS-CB messages to the base transceiver station (BTS) or Node B for broadcasting to the user equipment (UE) i.e. mobile device 100. The CBS system 200 may be configured in accordance with 3GPP TS 23.041. References to technical standards include current as well as future specifications of the standard.

The cell broadcast system depicted by way of example in FIG. 2 thus includes a Cell Broadcast Center (CBC) 210 and one or more Cell Broadcast Entities (CBE) 220 which are the content providers that create the message content. A content provider creates the message using the CBE and selects the location(s) or cell(s) for broadcasting the message. The message is then sent to the CBC, which maps the target area to the mobile network cells. Subsequently, the CBC transmits the message to the radio access network(s) to be broadcast in the targeted cells. For example, the system of FIG. 2 may be used for broadcasting alerts or notifications (e.g. weather alerts, security alerts) as part of the Commercial Mobile Alert System (CMAS) or any other wireless emergency alert system.

Figure 3:
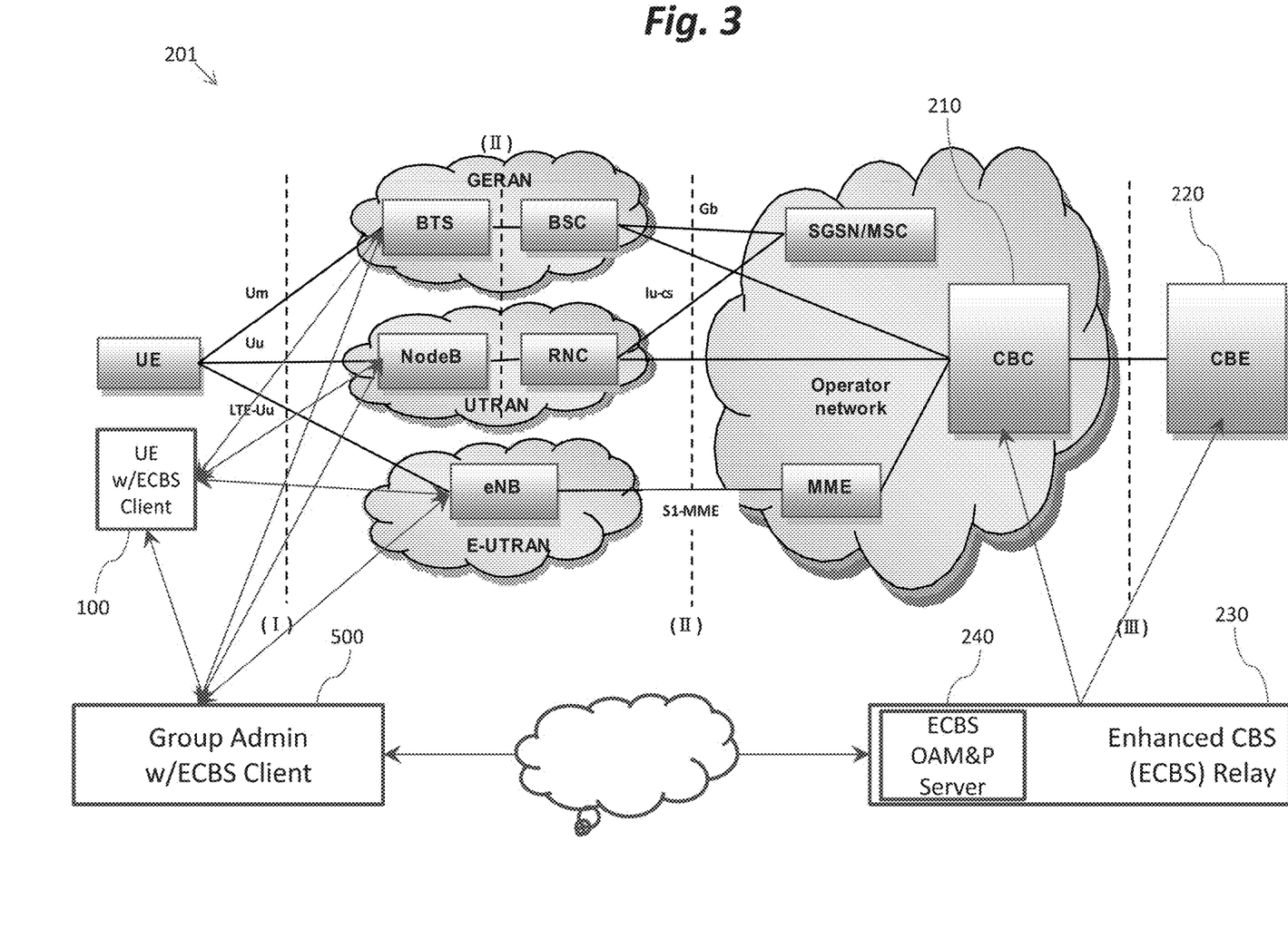
FIG. 3 is a depiction of an enhanced cell broadcast system (ECBS) in accordance with one embodiment of the new technology.

An enhanced cell broadcast system 201 is depicted by way of example in FIG. 3. As shown by way of example in the embodiment illustrated in FIG. 3, the system 201 includes an ECBS relay 230, an ECBS OAM&P server 240, a group administrator mobile device 500 with the ECBS client application, and the defined group of mobiles devices 100 with the ECBS client application. The group administrator client device 500 may alternatively comprise any other type of computing device, e.g. desktop computer, laptop computer, tablet, etc. The relay 230 may be any suitable computing device (or group or cluster of such devices)

having a processor, memory, and interfaces for managing the connections between the ECBS OAM&P server and the multiple carrier network CBE 220 and CBC 210 nodes. The OAM&P server 240 may comprise any suitable computing device (or group or cluster of such devices) having a processor, memory, and interfaces managing the group memberships, group keys and group channels, communicating with the ECBS relay 230, and providing responses to the ECBS client application. In one implementation, the processor and memory cooperate to execute two software modules: an operations, administration, maintenance, and provisioning (OAM&P) module to administer the groups, keys, channels, device provisioning, and optional message encryption, and a relay module to handle group message transmission to the designated cellular network(s). In other implementations, these modules may be amalgamated into a single module or these modules may be separated into any number of software modules or components.

The enhanced system enables secure cell broadcast service messages to be broadcast over a reserved channel to a group of mobile devices having the key for decrypting the encrypted messages. The decryption key in one embodiment may be an asymmetric private key counterpart to a public key. The decryption key in another embodiment may be a symmetric key. In one implementation, the group is first defined by the service provider on the ECBS OAM&P server 240 upon request from a group administrator. Group elements such as group name, group administrator account, username and password, expiry date, and additional OAM&P parameters (e.g. billing requirements) are assigned to the ECBS group. A channel is reserved for the group. Cryptographic key material is associated with the group. In an asymmetric or public-key embodiment, the key material comprises a key pair including a public key to be used by the group administrator device and a private key to be used by the mobile devices of the group. In a symmetric-key embodiment, the key material comprises a symmetric key to be used by the group administrator device and the mobile devices of the group. The group administrator on a group administrator device 500 employs the ECBS client application using the applicable group administrator account, username and password, to retrieve the group configuration data and securely provision and manage these on the mobile devices 100 of the group. Thereafter the mobile devices of the group can receive and decrypt secure messages that are broadcast on the reserved channel.

In the embodiment depicted in FIG. 3, a group administrator 500 may communicate with the ECBS OAM&P server 240, over the Internet or other data network. Upon a request by a group administrator device 500, a group is configured on the ECBS OAM&P server 40. The server 240 associates cryptographic key material and a channel with the group. The key material may be a secret key for symmetric encryption. The key material may be a key pair for public key encryption including a public key and a private key which may be obtained by a key generation server of a public key infrastructure (PKI) provider. The key and channel are securely provided to the group administrator device 500 to provision the mobile devices of the group. This may be done using a secure provisioning system (secure remote access) or by direct entry on a mobile device that is physically co-located with the group administrator device 500, e.g. using a USB connection. In one example, the group may include employees of an enterprise, corporation, government, educational institution, or other organization, and the key may be securely distributed in person, via hand delivery, or within the organization's secure network. Once the key material including symmetric keys or private keys is distributed to the mobile devices 100, the group administrator can deliver secure ECBS messages over the network (e.g., as text or binary messages) to the mobile devices of the group that are within a selected geographical area as defined by the targeted cells parameter. In other words, a CBS geoscope parameter is set up to match the targeted cells for the particular message. Message content is created and typically encrypted by the group administrator client 500 and then transmitted to the ECBS OAM&P server 240 which in turn forwards valid and non-expired messages to the ECBS relay 230. The message may in some circumstances be encrypted by the OAM&P server 240 or by the relay 230. In a variant, encryption may be disabled (suppressed) by the group administrator.

In one implementation, the group administrator may be an administrator of a user group for a public or enterprise entity such as a government agency, corporation, or other organization. The group administrator device 500 with the ECBS client encrypts the message using the group key and sends the encrypted message to the OAM&P server. The OAM&P server sends the message to the ECBS relay (broadcast server) 230 which communicates with the necessary CBE(s) and CBC(s) to transmit the message via the GERAN, UTRAN or E-UTRAN to the BTS or Node B for broadcast into the targeted cells that correspond to the selected geographical area. In addition to GSM, UMTS, LTE, CDMA, the ECBS may be transported over Wi-Fi, or any other compatible transport mechanism, whether currently existing or developed in the future. The mobile device 100 receives the encrypted message on the prescribed secure broadcast channel, decrypts the message using the private key stored in the memory of the mobile device and then displays the message for the user to read. The message may be presented by an SMS client or other messaging client on the mobile device that is capable of presenting other (unencrypted) SMS or ECBS messages. Alternatively, the message may be presented in a dedicated secure SMS client. This technology may be implemented in 3GPP (e.g. GSM, UMTS or LTE), as shown, or it may be implemented analogously in code division multiple access (CDMA). In some embodiments, the ECBS messages may be delivered over Wi-Fi, i.e. ECBS messages may be transmitted from the CBC via a carrier packet data network (which may include the Internet) to a mobile device connected to a Wi-Fi network. In one example, the group includes employees of a corporation (or other enterprise), and the ECBS messages may be received via a corporate (or enterprise) Wi-Fi network.

Figure 4:
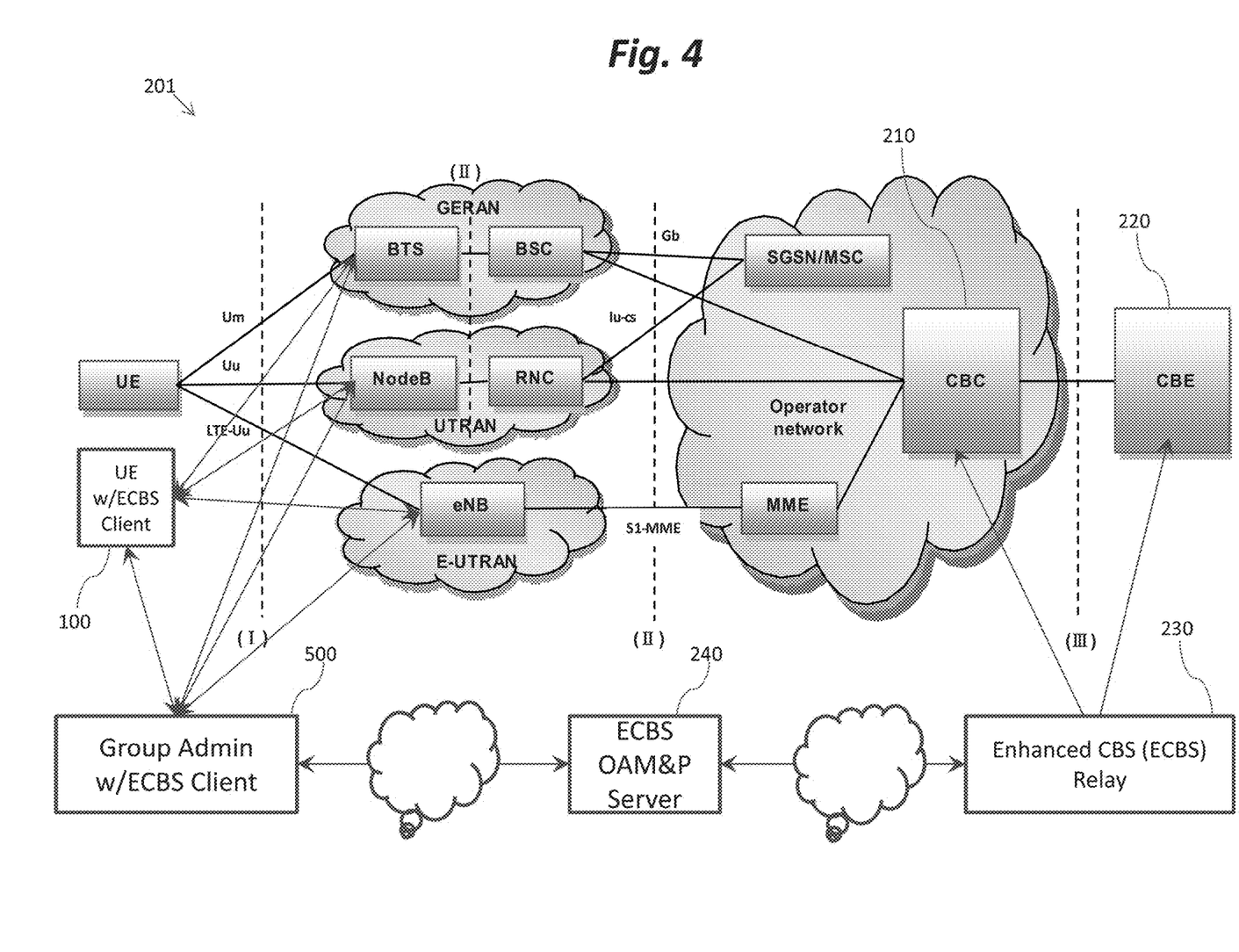
FIG. 4 is a depiction of another enhanced cell broadcast system in accordance with another embodiment of the new technology in which an ECBS operations, administration, maintenance, and provisioning (OAM&P) server is located remotely from an ECBS relay.

FIG. 4 depicts another system 201 in which the ECBS OAM&P server 240 is located remotely (decoupled) from an ECBS relay 230. This technology may be implemented in 3GPP (e.g. GSM, UMTS or LTE, etc.), as shown, or it may be implemented analogously in code division multiple access (CDMA), or other cellular network standard. In some embodiments, the messages may be delivered over Wi-Fi.

A method of creating or defining a secure broadcast group of mobile devices for subsequently receiving encrypted CBS messages is now described with reference to FIG. 5A. The method, which is performed by a computing device such as the ECBS relay 230 with an OAM&P function or a separate OAM&P server 240, may entail a step, act or operation of requesting 300 group creation (or receiving such a request at one of these servers from a user). The method includes a step, act or operation of defining 302 a group of mobile devices having an optional group expiry time and a group administrator, reserving 310 a channel for the group and providing a default targeted cells parameter for the group, and associating 320 cryptographic key material with the group. The key material may, for example, comprise part of a key pair including a public key and a private key for asymmetric encryption, i.e. public-key encryption. Alternatively, the key material may comprise a secret key for symmetric encryption. The group may also be associated with any other desired parameters (e.g. billing requirements and/or service levels). For example, service level parameters may relate to message prioritization, support for data storage and recovery, secure group management backup on the OAM&P server, multiple linked accounts, multiple administrators, etc. The method of FIG. 5A may further entail adding and/or deleting 322 a group. Although the group may be a group of mobile devices, the group (in other embodiments) may be understood as a group, collection or set of entities, e.g. mobile users, capable of receiving (or having equipment that is capable of receiving) the secure broadcast messages.

Reserving the channel for the group may involve selecting the channel from amongst a set of reserved channels used by the associated network(s) exclusively for broadcasting secure messages. Defining the group may be accomplished by generating, sending, receiving and/or storing data identifying the group of mobile devices, which may include any suitable unique device identifier (UDID) such as the International Mobile Station Equipment Identity (IMEI). In another implementation, the group may be defined using the international Mobile Subscriber Identity (IMSI) associated with a SIM card of the mobile device. The specific mobile device identifiers may be stored in the group administrator device 500. In addition, these device identifiers may also be stored in plain or encrypted format on the OAM&P server 240.

Figure 5A:
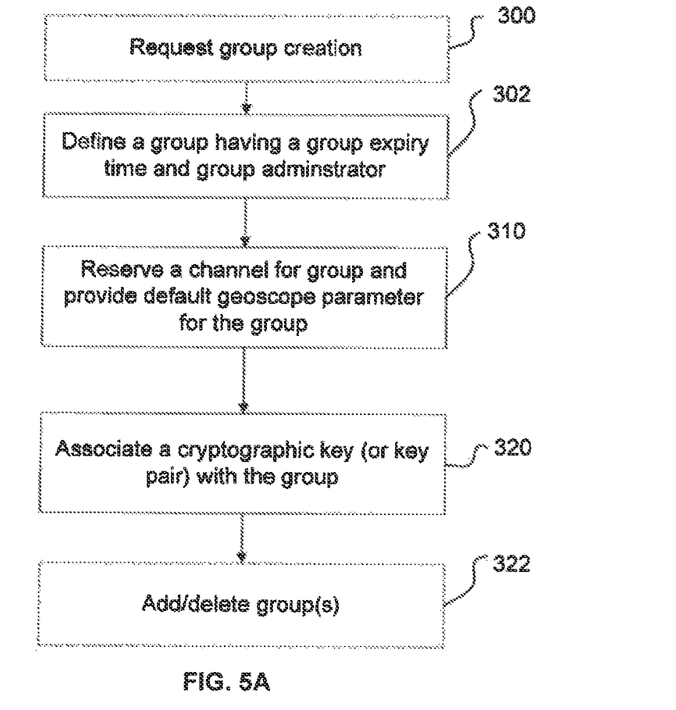
FIGS. 5A and 5B are flowcharts outlining methods of creating a private ECBS group and provisioning group devices for receiving secure messages.
Figure 5B:
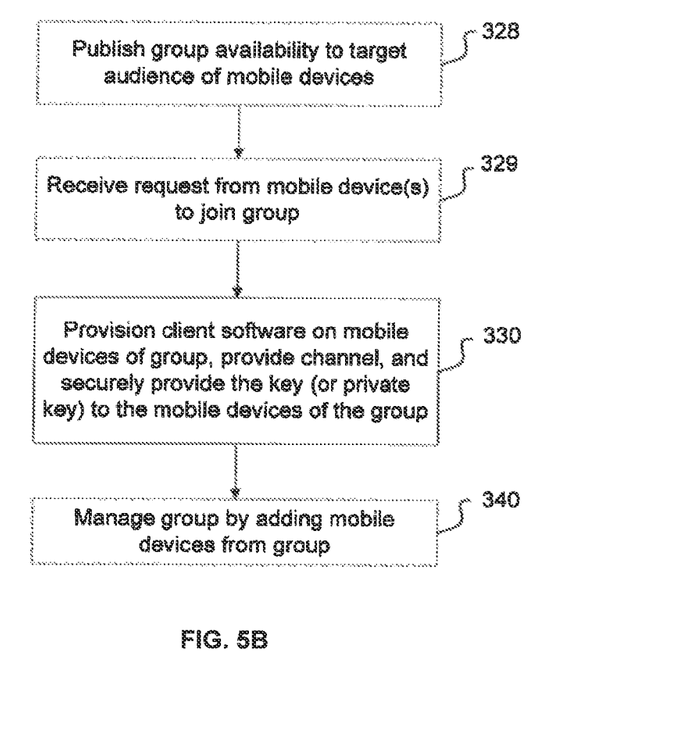

In FIGS. 5A and 5B, steps 300-322 are performed by the OAM&P server 240 to create a group whereas steps 328-340 are performed by the group administrator device 500 for a group already created by the OAM&P server. As shown in FIG. 5B, the method may entail publishing 328 group availability to target audiences of mobile devices and receiving 329 requests from users of mobile devices to join the group. The method further entails provisioning 330 client software on the mobile devices of the group, providing the channel and securely providing the (private) key to the mobile devices of the group. The method may further entail managing 340 the group membership by adding mobile devices to the group.

The method of securely broadcasting CBS messages may be implemented in 3GPP standards such as GSM, UMTS or LTE, etc. or it may be implemented analogously in code division multiple access (CDMA), or other cellular network standard or Wi-Fi specification.

Figure 6:
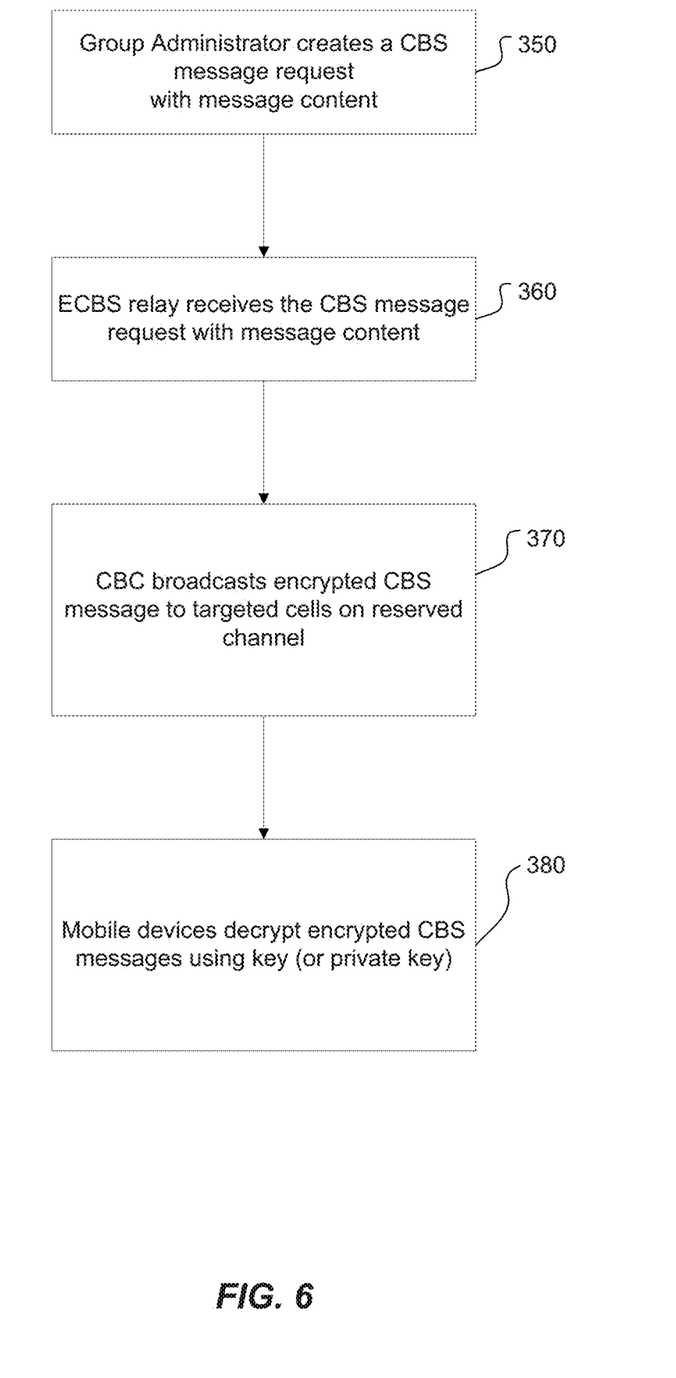
FIG. 6 is a flowchart outlining a method of broadcasting secure messages.

A method of securely broadcasting the encrypted CBS message is now described with reference to FIG. 6. This method of secure broadcasting may be initiated when the group administrator creates 350 an ECBS message request with message content, e.g. an alert, notification, or any other desired content, and sends it to the OAM&P server 240. As shown in FIG. 6, the method entails the OAM&P server receiving the resulting message 360 and forwarding valid messages (e.g. from the administrator of the unexpired ECBS groups) to the ECBS relay 230. The ECBS relay in turn forwards the (encrypted) message to the applicable CBE(s) and CBC(s) for CBS encapsulation and broadcasting 370 on the reserved channel(s) to all mobile devices in a geographical area to enable reception and decryption 380 of the encrypted CBS message by the group of mobile devices by using the (private) key. The ECBS message is typically encrypted by the group administrator device 500 using the group public key (or with a secret key) prior to sending to the OAM&P server 240. Alternatively, the ECBS message may be encrypted by the OAM&P server or the relay in response to receiving the ECBS message request by the group administrator device 500.

Decryption may be automatic or triggered in response to user input. The decrypted message may remain permanently decrypted or, optionally, after reading the securely broadcasted message, the device may automatically re-encrypt the message or delete the decrypted message, leaving only the encrypted form of the message that was received.

Other mobile devices that are not part of the group (and thus lack the client software and the private key or secret key) may receive the secure messages if they are monitoring the broadcast channel but cannot decrypt them. This technology is useful to broadcast secure messages to a group of mobile devices without publicly broadcasting the message for all to read. This technology may be particularly useful for police, firefighters, ambulance crews, municipal workers, postal workers, military personnel, government workers, employees of a corporation, or others wishing to receive secure broadcasts.

Figure 7:
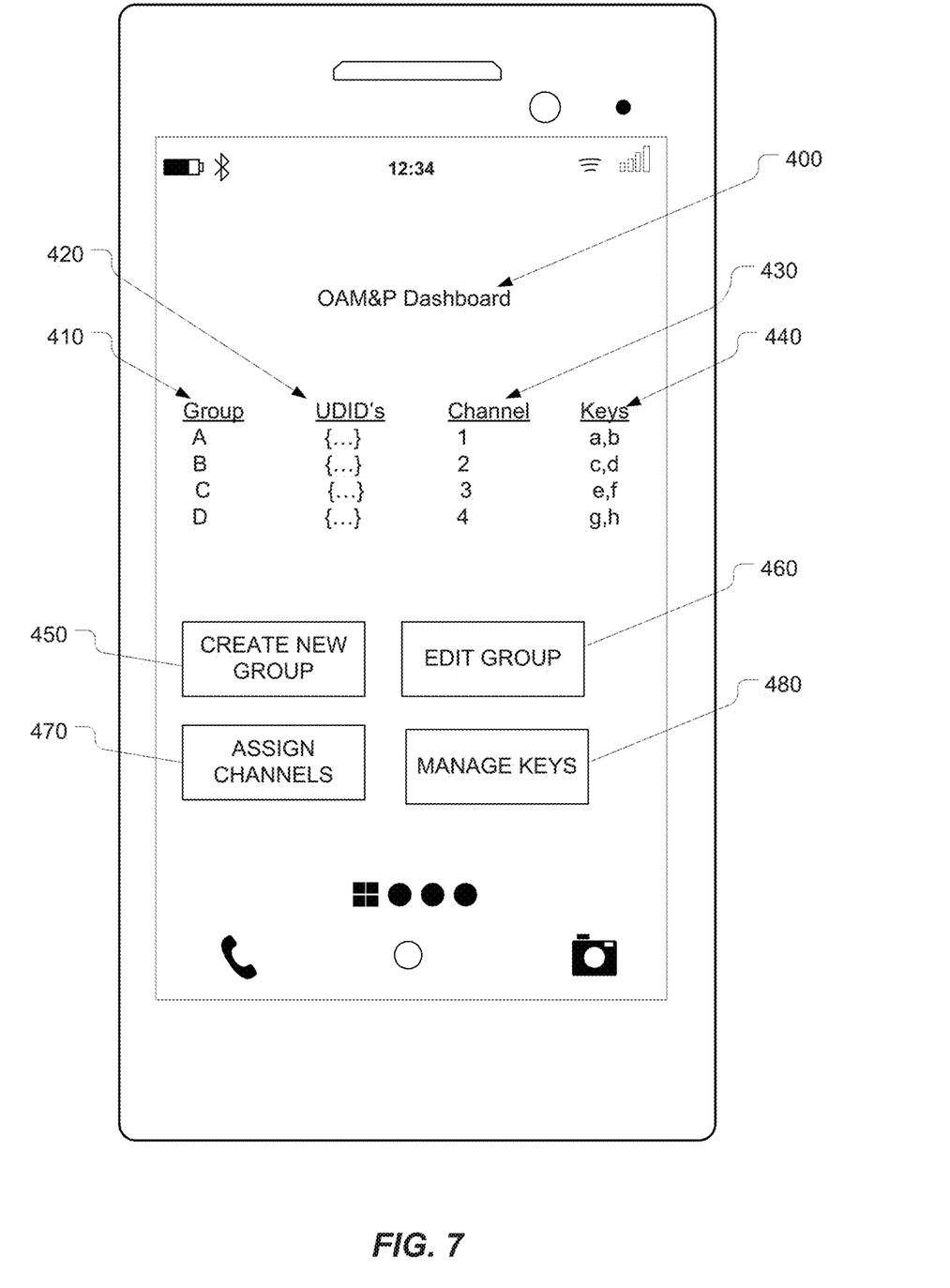
FIG. 7 is a depiction of a user interface provided by an ECBS OAM&P server used by a service provider to manage all ECBS groups.

FIG. 7 is a depiction of an operations, administration, maintenance, and provisioning (OAM&P) client on a mobile device (or other computing device). The OAM&P client may display an OAM&P dashboard 400 (or equivalent interface). By way of example, this dashboard may present virtual buttons (or other user interface elements) to enable various group-related functions to be performed using this interface or dashboard. Optionally, as by way of example, the dashboard 400 may display the secure broadcast groups 410 and the mobile devices associated with each group. The devices may be identified by their IMEI or other UDID 420. The interface or dashboard 400 may also present the channel (s) 430 assigned to each group and the cryptographic keys 440 for each group. The table shown in FIG. 7 is only an example of one way to present this data to the group administrator. This data may be presented in any other format. Various other user interface elements (virtual buttons, menus, toggles, etc.) may optionally be provided to perform other OAM&P functions, e.g. create a new group 450, edit a group 460, assign channels 470, or manage keys 480. The dashboard 400 may also provide other functions, settings and preferences for the group administrator to create and manage the groups, including adding or deleting groups or assigning a new administrator. Editing a group may involve adding or removing one or more devices from the group. Removing a member may be accomplished by issuing new cryptographic keys to all members except the member to be removed.

Figure 8:
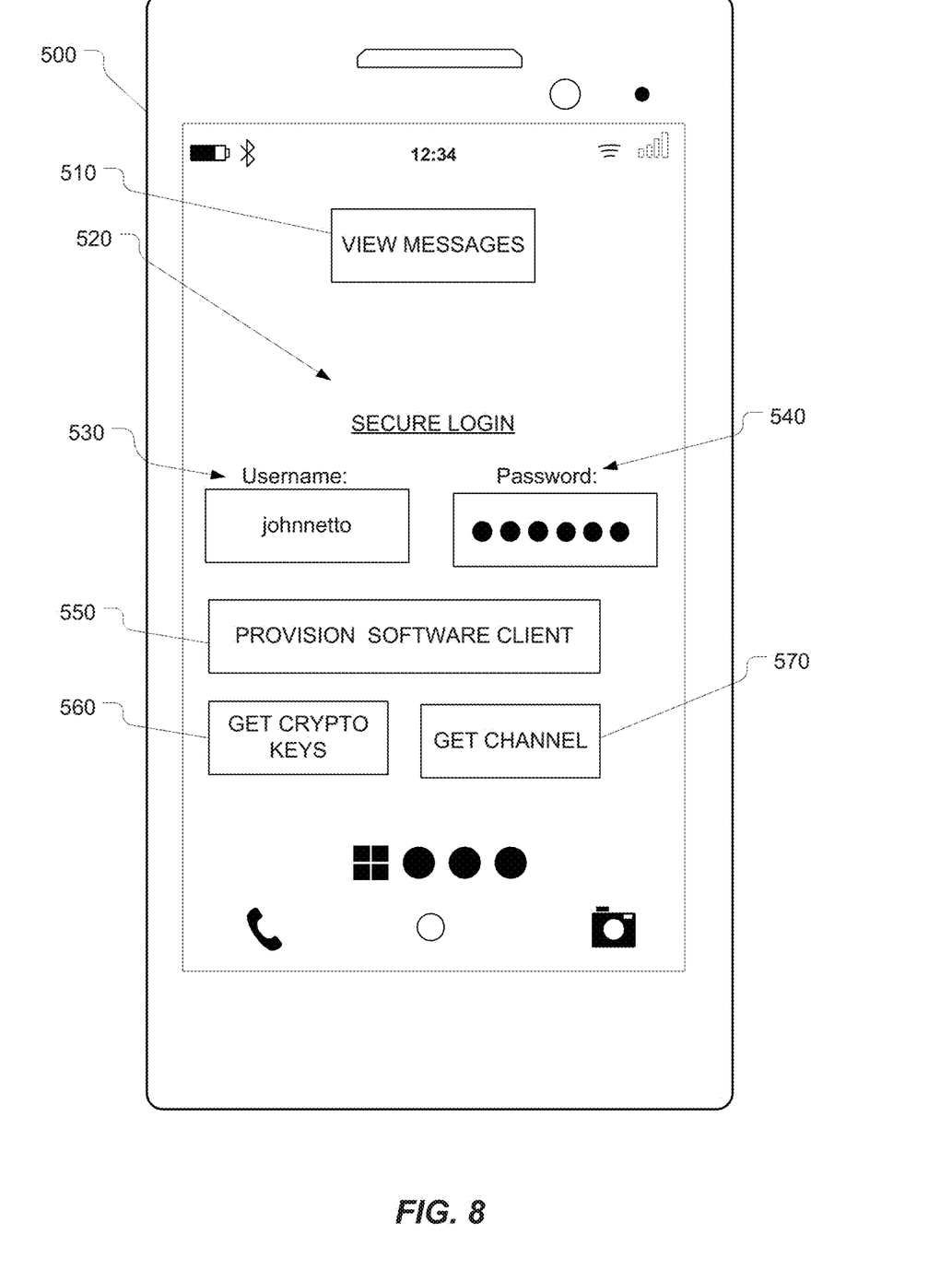
FIG. 8 is a depiction of a mobile device providing a group administration client for managing an ECBS group by a group owner.

FIG. 8 is a depiction of a mobile device 500 as an example of a computing device that acts as a group administrator device. The group administrator device 500 may comprise any computing device such as a desktop computer, laptop computer, tablet, etc. The mobile device 500 runs a group administration client (application) enabling a group administrator to create and manage groups. The group administrator client executed by the mobile device 500 presents a graphical user interface such as a group administration dashboard. For example, the group administrator may view messages using View Messages button 510. A secure group administrator login 520 (e.g., with username 530 and password 540) to the OAM&P server enables access to other functions such as provisioning client software 550, getting the cryptographic keys 560 and getting (or reserving) a channel 570.

In a further implementation, the method may entail receiving a membership request from a mobile user requesting membership in the group and processing the request according to membership criteria. In this particular method, a mobile user wishing to join a group may request membership in the group by sending a membership request to the group administrator device which can accept or reject the membership request. The membership request may be in the form of an e-mail, SMS, web registration, or any equivalent means. The new member may be added to the group by using the edit group function 460 described above with respect to FIG. 7. If the mobile user joins the group, a private key or secret key is securely provided to the new member along with the channel information for the group. In a similar vein, a mobile device that is part of a group may request removal from the group. In another implementation, the channel information may be changed by notifying all devices in the group. Optionally, new keys may be distributed to the devices in the group after a certain time has elapsed, e.g. one year.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It is to be understood that the singular forms "a," "an," and "the" include plural referents unless the context clearly dictates otherwise. Thus, for example, reference to "a processor" includes reference to one or more of such processors, i.e. that there is at least one processor. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and does not pose a limitation on the scope of the invention unless otherwise claimed.

This invention has been described in terms of specific embodiments, implementations and configurations which are intended to be exemplary only. Persons of ordinary skill in the art will appreciate, having read this disclosure, that many variations, modifications and refinements may be made without departing from the inventive concept(s) presented herein. The scope of the exclusive right sought by the Applicant(s) is therefore intended to be limited solely by the appended claims and their equivalents.

The invention claimed is:

1. A secure cell broadcast method comprising:
defining a group of mobile devices, wherein each mobile device in the group has first client software responsible for displaying secure broadcast messages and second client software responsible for displaying unsecure broadcast messages, the first client software being different than the second client software, the first client software being a dedicated client for the secure broadcast messages;
reserving a channel for the group, said reserving comprising selecting the channel from amongst a set of channels used exclusively for broadcasting the secure broadcast messages;
receiving a membership request from a new mobile device requesting membership in the group and adding the new mobile device to the group;
in response to receiving the membership request, provisioning the first client software on the new mobile device for displaying the secure broadcast messages;
associating cryptographic key material with the group;
notifying the mobile devices of the channel for the group;
securely providing the key material to the mobile devices of the group, the key material including a decryption key;
receiving, from a device running the first client software under a group administrator account, the secure broadcast messages; and
broadcasting on the channel the secure broadcast messages that are encrypted such that the mobile devices of the group receiving on the channel can receive and decrypt the secure broadcast messages using the key material, wherein the mobile devices of the group display the secure broadcast messages using the first client software.

2. The method as claimed in claim 1, further comprising publishing the availability of the group.

3. The method as claimed in claim 1, further comprising specifying an expiry time for the group.

4. The method as claimed in claim 1, further comprising providing a parameter defining a geographical area for receiving the secure broadcast messages.

5. A non-transitory computer-readable medium comprising instructions in code, which, when loaded into a memory and executed by a processor of one or more computing devices, cause the one or more computing devices to:
define a group of mobile devices, wherein each mobile device in the group has first client software responsible for displaying secure broadcast messages and second client software responsible for displaying unsecure broadcast messages, the first client software being different than the second client software, the first client software being a dedicated client for the secure broadcast messages;
reserve a channel for the group by selecting the channel from amongst a set of channels used exclusively for broadcasting the secure broadcast messages;

receive a membership request from a new mobile device requesting membership in the group and add the new mobile device to the group;

in response to receiving the membership request, provision the first client software on the new mobile device for displaying the secure broadcast messages;

associate cryptographic key material with the group;

notify the mobile devices of the channel for the group;

securely provide the key material to the mobile devices of the group, the key material including a decryption key;

receive, from a device running the first client software under a group administrator account, the secure broadcast messages; and broadcast on the channel the secure broadcast messages that are encrypted such that the mobile devices of the group receiving on the channel can receive and decrypt the secure broadcast messages using the key material, wherein the mobile devices of the group display the secure broadcast messages using the first client software.

6. The computer-readable medium as claimed in claim 5, further comprising code for publishing of an availability of the group.

7. The computer-readable medium as claimed in claim 5, further comprising code specifying an expiry time for the group.

8. A secure cell broadcast system comprising:

one or more computing devices each having a memory coupled to a processor, wherein the one or more computing devices are configured to:

define a group of mobile devices, wherein each mobile device in the group has first client software responsible for displaying secure broadcast messages and second client software responsible for displaying unsecure broadcast messages, the first client software being different than the second client software, the first client software being a dedicated client for the secure broadcast messages;

reserve a channel for the group by selecting the channel from amongst a set of channels used exclusively for broadcasting the secure broadcast messages;

receive a membership request from a new mobile device requesting membership in the group and to add the new mobile device to the group;

in response to receiving the membership request, provision the first client software on the new mobile device for displaying the secure broadcast messages;

associate cryptographic key material with the group;

notify the mobile devices of the channel for the group;

securely provide the key material to the mobile devices of the group, the key material including a decryption key;

receive, from a device running the first client software under a group administrator account, the secure broadcast messages; and broadcast on the channel the secure broadcast messages that are encrypted such that the mobile devices of the group receiving on the channel can receive and decrypt the secure broadcast messages using the key material, wherein the mobile devices of the group display the secure broadcast messages using the first client software.

9. The system as claimed in claim 8, wherein at least one processor is configured to publish an availability of the group.

10. The system as claimed in claim 8, wherein at least one processor is configured to specify an expiry time for the group.

11. The system as claimed in claim 8, wherein the key material comprises a public/private key pair and the decryption key comprises a private key of the public/private key pair.

12. The system as claimed in claim 8, wherein the decryption key comprises a symmetric key.

* * * * *